United States Patent
Kelly

(10) Patent No.: US 9,203,302 B2
(45) Date of Patent: Dec. 1, 2015

(54) METHOD OF DETERMINING DC-DC CONVERTER LOSSES AND A DC-DC CONVERTER EMPLOYING SAME

(75) Inventor: Anthony Kelly, Old Kildimo (IE)

(73) Assignee: POWERVATION LIMITED, Blackrock, Cork (IE)

( * ) Notice: Subject to any disclaimer, the term of this patent is extended or adjusted under 35 U.S.C. 154(b) by 795 days.

(21) Appl. No.: 13/378,940

(22) PCT Filed: May 14, 2010

(86) PCT No.: PCT/EP2010/056679
§ 371 (c)(1),
(2), (4) Date: Aug. 13, 2012

(87) PCT Pub. No.: WO2010/130836
PCT Pub. Date: Nov. 18, 2010

(65) Prior Publication Data
US 2013/0038306 A1    Feb. 14, 2013

(30) Foreign Application Priority Data

May 14, 2009 (GB) .................................. 0908283.5

(51) Int. Cl.
| G05F 1/46 | (2006.01) |
| H02M 3/156 | (2006.01) |
| H02M 3/157 | (2006.01) |
| H02M 3/335 | (2006.01) |

(52) U.S. Cl.
CPC .............. *H02M 3/156* (2013.01); *H02M 3/157* (2013.01); *H02M 3/33507* (2013.01); *H02M 3/33515* (2013.01)

(58) Field of Classification Search
None
See application file for complete search history.

(56) References Cited

U.S. PATENT DOCUMENTS

| 6,031,362 | A | 2/2000 | Bradley |
| 6,351,396 | B1 | 2/2002 | Jacobs |
| 6,400,581 | B1 | 6/2002 | Lee |
| 2003/0030404 | A1* | 2/2003 | Iwaji et al. ..................... 318/700 |
| 2005/0199813 | A1 | 9/2005 | Van Bogget |
| 2006/0007713 | A1 | 1/2006 | Brown |
| 2006/0197574 | A1 | 9/2006 | Naviasky et al. |
| 2007/0222463 | A1 | 9/2007 | Qahouq |
| 2008/0072080 | A1* | 3/2008 | Chapuis et al. ............... 713/300 |
| 2008/0278123 | A1 | 11/2008 | Mehas et al. |
| 2011/0210707 | A1* | 9/2011 | Marsili et al. ................. 323/271 |

FOREIGN PATENT DOCUMENTS

| WO | WO 2004/006037 A2 | 1/2004 |
| WO | WO 2007/053599 A2 | 5/2007 |
| WO | WO 2010/130836 A2 | 11/2010 |

OTHER PUBLICATIONS

European Patent Office, International Searching Authority, Search Report and Written Opinion mailed Nov. 15, 2010 for International Application No. PCT/EP2010/056679, International Filing Date: Jun. 14, 2010, 16 pages.
Search Report Under Section 17 for GB Patent Application No. GB 0908283.5, Date of Search: Oct. 2, 2009, 4 pages, Intellectual Property Office, South Wales, United Kingdom.
European Patent Office, "Search Report" in application No. 10 720 593.2-1809, dated Jun. 13, 2014, 6 pages.
Claims in European Application No. 10 720 593.2-1809, dated Jun. 2014, 3 pages.

* cited by examiner

*Primary Examiner* — Nguyen Tran
*Assistant Examiner* — Monica Mata
(74) *Attorney, Agent, or Firm* — Hickman Palermo Becker Bingham LLP; Edward A. Becker

(57) ABSTRACT

The present application provides a method of calculating DC-DC converter power losses without the requirement for a measurement of input current. The application also describes the use of such a calculation to determine the optimum point for switchover between a single phase mode or dual phase mode in a two phase DC-DC power supply.

26 Claims, 11 Drawing Sheets

$y = P \cdot d \quad P = y \cdot d^{-1}$

METHOD OF DETERMINING DC-DC CONVERTER LOSSES AND A DC-DC CONVERTER EMPLOYING SAME

CROSS-REFERENCE TO RELATED APPLICATIONS; BENEFIT CLAIM

This U.S. National Stage Patent Application under 35 U.S.C. §371 claims the benefit of International Application No. PCT/EP2010/056679 filed May 14, 2010, which claims the benefit of British Patent Application No. GB 0908283.5 filed May 14, 2009, the entire contents of all of which is hereby incorporated by reference as if fully set forth herein, under 35 U.S.C. §119(e).

FIELD OF THE APPLICATION

The present application relates to switching power supplies and in particular to methods of measuring losses and currents in a DC-DC converter and employing such measurements in the control of DC-DC converters.

PRIOR-ART

Switching power supplies are preferred to linear power supplies as they provide a number of advantages including the ability to increase the voltage or provide a negative voltage and more importantly because of their greater efficiencies.

The efficiency of a power converter is an extremely important characteristic as any inefficiency translates directly into power loss which, for example, generates heat and in the case of battery powered equipment shortens battery life.

Power reduction methods have been developed to improve the efficiency of converters at different modes of operation. Examples of these power reduction methods would include phase shedding, pulse frequency modulation and pulse skipping. In phase shedding, for example, if two phases are available a first mode of operation may be employed using only one phase at light loads where switching losses dominate and a second mode of operation may be employed with two phases at higher loads where resistance losses dominate, as shown in the exemplary graph showing the efficiency versus load current for two modes. The ideal situation is to switch between the two modes at the point where the power loss for either mode would be the same, which in the exemplary representation of FIG. 1 would be at approximately 17 Amps (shown by dashed-dotted line).

Traditionally, power converters do not have a signal\measurement to represent the loss of the converter. Therefore, power reduction methods cannot generally be implemented in power converters to maximize efficiency since the loss is unknown. Instead, power reduction methods typically are configured to switch between modes of operation at particular predefined set points. These predefined set points are estimates of the optimal position for switching between modes of operation.

In the field of digital power control, attempts have been made to measure converter efficiency. For example, Abu-Qahouq, J. A. and L. Huang (2007). Adaptive Controller with Mode Tracking and Parametric Estimation. Applied Power Electronics Conference, implements efficiency improvements based upon the power converter's mode of operation. However the method employs input current sensing, which introduces the requirement and cost for an additional sensor. Moreover, current sensing techniques actually incur a further power loss and/or suffer from noise and other problems. A further problem is that there may be different supplies\voltages for the supply current and the switching currents, with the result that there is no one measure of input current which may be employed for loss calculations.

Another technique that is employed is a non-parametric method which seeks to maximize efficiency and operates on the principle that the duty cycle corresponds to the power transfer and that accordingly by minimizing the duty cycle, the power loss is minimized. For example, Yousefzadeh, V. and D. Maksimovic (2005). Sensorless optimization of dead times in DC-DC converters with synchronous rectifiers. Applied Power Electronics Conference and Exposition, 2005. APEC 2005. Twentieth Annual IEEE employs this technique to optimize the dead time of the power stage. Whilst this is a sensorless technique, the duty cycle signal is affected by many varying parameters such as input voltage and power stage gain, and is not applicable in applications which require an estimation of absolute power. Because of this, the application of this method to optimize power converter losses more generally, is limited. Thus, the method whilst applicable to dead time applications are not generally suitable for use with the power reduction methods described. In addition, the duty cycle values tend to be extremely noisy and subject to measurement errors.

SUMMARY

Accordingly, there is a general need to develop a method to estimate power converter losses. Optimisation of the power converter may be performed based upon this estimate. The estimate may also be used for other purposes including, for example, providing information to a user and\or for the purposes of controlling a fan or other cooling device.

The present application offers a method which provides a measurement of the loss of a converter using measurements taken from within the control circuitry, without the need for a direct measurement and comparison of the input current. The method uses measurements which may be generally employed in power converters for other purposes and thus do not add to the complexity or circuitry requirements. The method may be employed to provide feedback for control and monitoring purposes. In a first arrangement, the method estimates the ideal gain of the converter to minimize controller errors and employs this ideal gain to provide a measurement of power loss. The present method is a perfect unbiased estimate in that if the controller is working then the estimate is a perfect reflection of the losses since it compensates for them.

DETAILED DESCRIPTION

Figure 1:
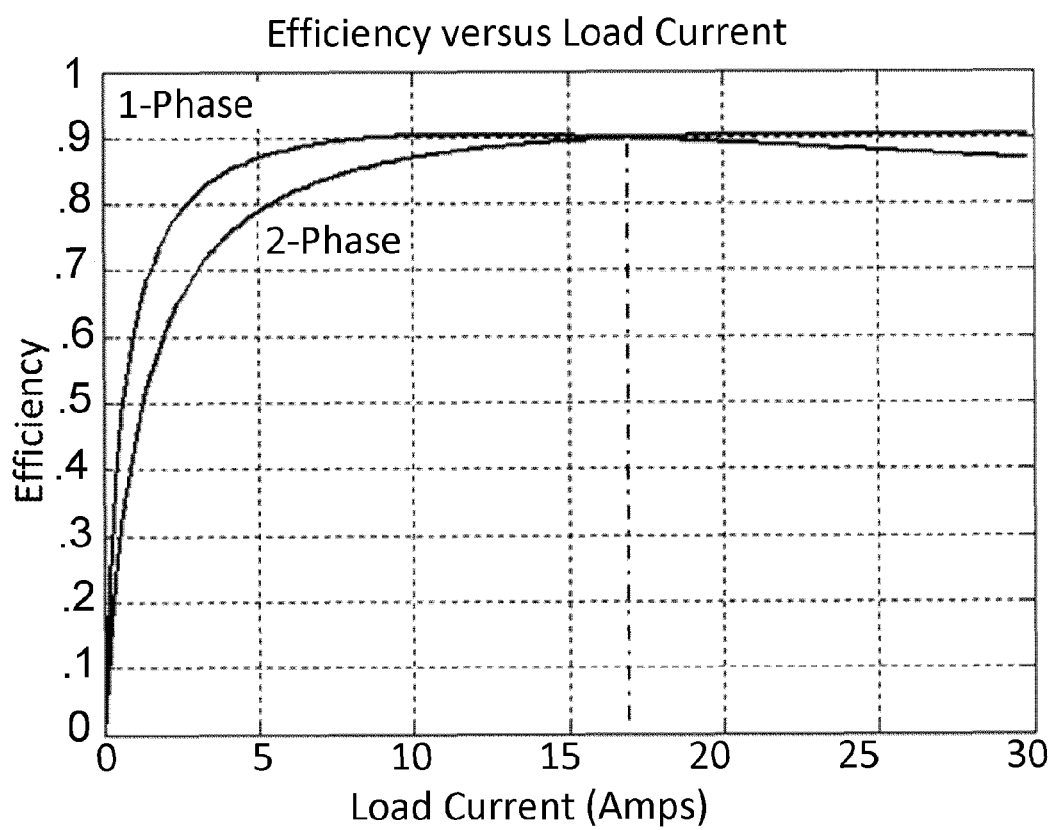
FIG. 1 is a graph illustrating exemplary efficiencies for the single phase and dual phase modes of a dual phase converter.
Figure 2:
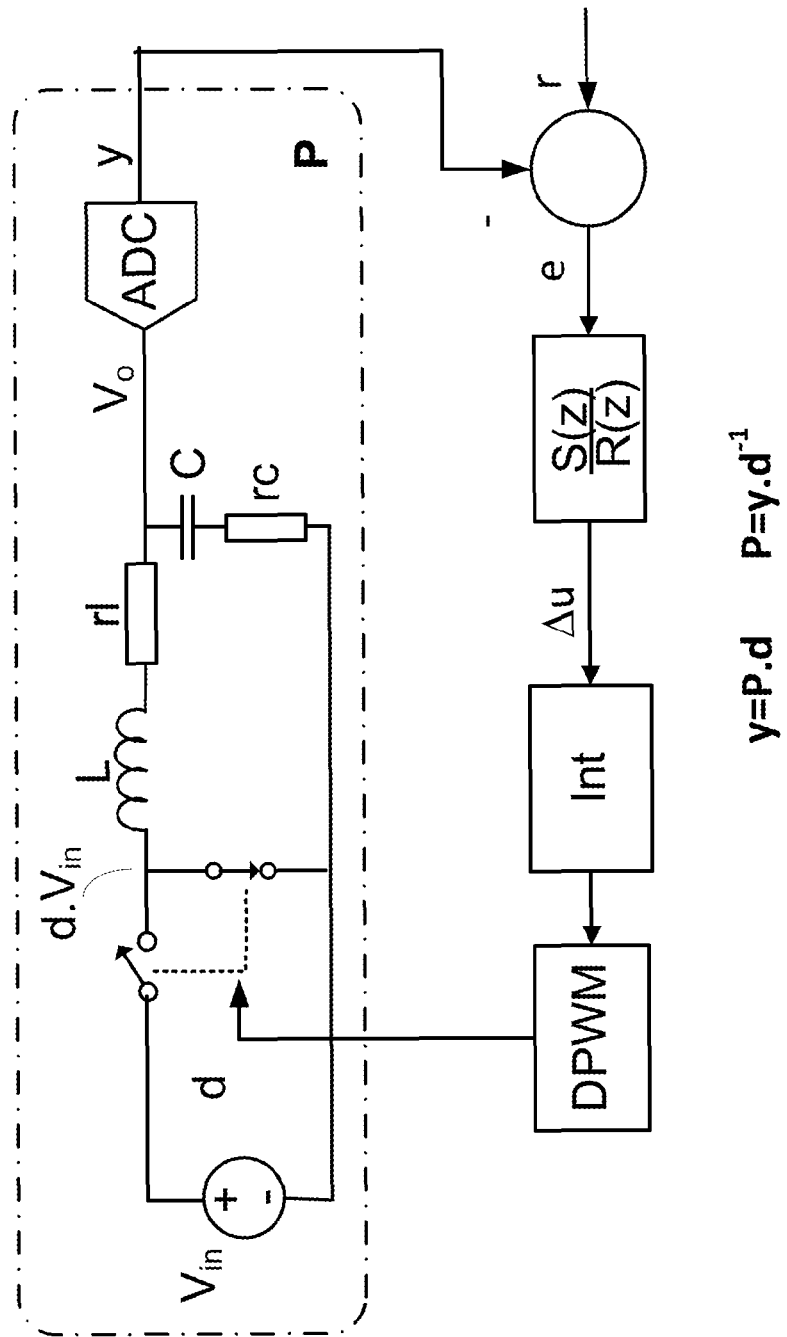
FIG. 2 is an exemplary switching converter of the type generally known as a buck converter in the art.

The method will now be described with reference to an exemplary buck converter which would be familiar to those in the art, as shown in FIG. 2. Although, the method may be used equally with other types of converter. The buck converter employs a switch to connect\disconnect an input voltage ($V_{in}$) with an inductor (L). The inductor in turn stores energy from the input voltage in magnetic form and provides it to an output. A capacitor (C) is employed to smooth the output ($V_o$). The ratio between the input voltage and output voltage is dependent on the duty cycle (d) of the switch which is typically adjusted to maintain a constant output voltage. To achieve this, the output voltage is sensed for example by means of an Analog to Digital converter (ADC), compared with a desired output voltage (r) and then fed back as a control signal through a feedback path, including in the example shown an integrator (Int) to adjust the duty cycle. Techniques for implementing this would be familiar to those skilled in the art.

The present application relies upon an auto-zero circuit provided within the feedback loop of the control system to provide an estimate of loss in the power train. This loss estimate is obtained from the auto-zero gain value of the auto-zero circuit. This value may be interpreted in a number of ways including for example:
  a) as a component of power loss which may then be minimised by varying other parameters so that the power loss is minimised without having to measure the power loss;
  b) as a means of estimating power train resistive loss;
  c) as a factor to derive input power if the output power is known;
  d) as representing inductor current.

Similarly, the auto-zero gain may be manipulated to calculate the optimum point to add or drop a phase in a multiphase power converter thereby improving efficiency over a wide range of conditions.

Figure 3:
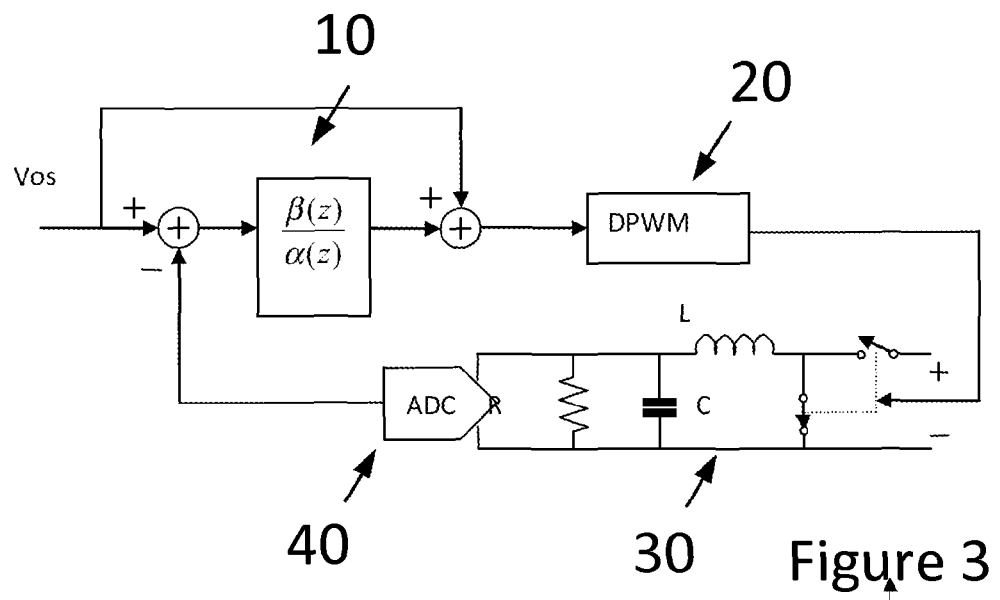
FIG. 3 is an arrangement of such a controller using feed forward control.

The estimation is based upon the auto-zero gain of the control loop. A description of the auto-zero loop now follows with reference to the controller of FIG. 3. This controller contains no integral property and therefore the closed-loop steady state error will not be zero. Zero steady-state error is generally a required property for dc-dc converters, so a feed-forward element is introduced into the control strategy to achieve this. The control system, shown in FIG. 3 comprises a controller 10, a feedforward element, a digital pulse width modulator (DPWM) 20, a power train 30, and an analog to digital converter (ADC) 40. Non-idealities may be dealt with by the inclusion of an auto-zero scheme.

Zero steady state-error to a step-input is a desirable property of a closed-loop buck regulator because of accuracy of the regulated level and limit cycling. Whilst it is possible to accommodate zero steady-state error to a step input by including an integrator before the plant, the additional phase lag introduced may be problematic in control loops, especially if this control loop forms the foundation for an adaptive control scheme, which is the intention here.

The auto-zero control loop which drives the steady state control-error to zero, whilst ensuring the correct output voltage under component tolerances and during deviations in the dc-dc converter input voltage. An interesting property of the auto-zero scheme as outlined is that the loop-gain remains constant under input voltage variations, providing more robust compensation.

In the interest of clarity for explanation purposes, the zero-control error method is considered first, then the mechanism of ensuring correct output voltage under input voltage deviations is considered, and finally a calibration scheme for dealing with component tolerances is introduced.

Auto-Zero Scheme

Figure 4:
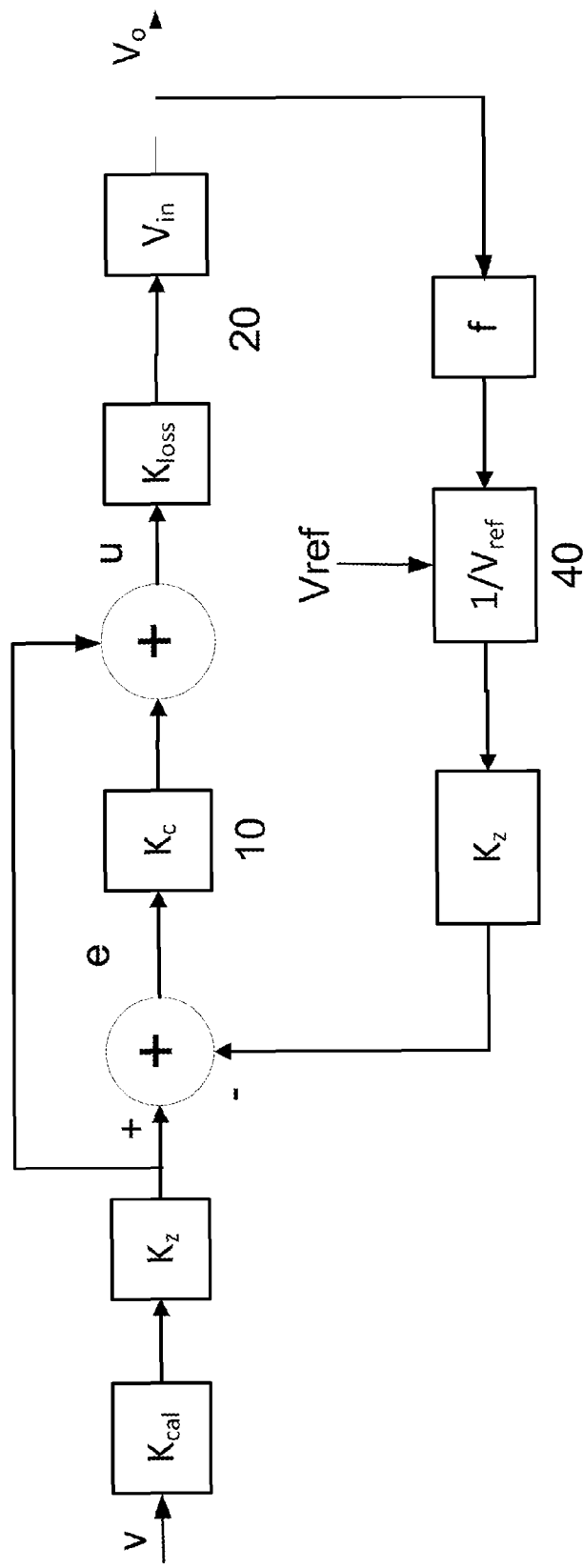
FIG. 4 is an auto-zero loop for use in a configuration such as FIG. 3.

Consider the representation of the digital control loop shown in FIG. 4, where the individual components of the loop are labelled according to their DC gain. Referring to FIG. 4, the control loop includes a controller 10, a DPWM/Plant 20, a feedback divider f, an ADC 40, and a gain-adjustment factor $K_z$.

The adjustment gain ($K_z$) has two main functions:
  1. Provides zero control-error for a step input. Without this, the constant disturbance is only rejected by the loop gain, which is finite, yielding a non-zero control error.
  2. Counteracts variations in $V_{in}$, providing line regulation and constant loop gain versus line. Effectively delivering 'line voltage feedforward' without the requirement for measuring $V_{in}$.

The feedback divider f, translates the output voltage such that a fullscale output voltage ($V_o = V_{in}$) corresponds to a full-scale digital code from the ADC 401.*e*. $f = V_{ref}/\bar{V}_{in}$, (where $\bar{V}$ represents the nominal voltage). In practice f may be split between the analogue and digital domains, e.g. $f = f_{an} \cdot f_{dig} = (1/4)(4/\bar{V}_{in})$, with $f_{an}$ implemented as a potential divider and $f_{dig}$ implemented as a digital multiply.

The output voltage may be calculated as follows:

With $f = V_{ref}/\bar{V}_{in}$, (where $\bar{V}$ represents the nominal voltage), and the setpoint $v = \bar{V}_o/\bar{V}_{in}$, for zero control-error (e=0), we have:

$$V_o = \frac{\bar{V}_o}{\bar{V}_{in}} \cdot K_{CAL} \cdot K_z \cdot K_{LOSS} \cdot V_{in} \quad (1)$$

In order to achieve zero control error:

$$\frac{\bar{V}_o}{\bar{V}_{in}} \cdot K_{CAL} \cdot K_z = \frac{\bar{V}_o}{\bar{V}_{in}} \cdot K_{CAL} \cdot K_z \cdot K_{LOSS} \cdot V_{in} \cdot f \cdot \frac{1}{V_{ref}} \cdot K_z \quad (2)$$

Therefore:—

$$1 = K_{LOSS} \cdot V_{in} \cdot f \cdot 1/V_{ref} K_z \quad (3)$$

and $$K_z = \frac{V_{ref}}{K_{LOSS} \cdot V_{in} \cdot f} \quad (4)$$

In operation $K_z$ is automatically adjusted in order to produce zero control-error, and therefore equation (4) holds, giving the output voltage as:

$$V_o = \frac{\bar{V}_o}{\bar{V}_{in}} \cdot K_{CAL} \cdot \frac{V_{ref}}{f} \quad (5)$$

Introducing an error f' into the feedback factor f:

$$f = f' \frac{V_{ref}}{V_{in}} \quad (6)$$

The output voltage is:

$$V_o = \overline{V}_o \cdot \frac{K_{CAL}}{f'} \quad (7)$$

Therefore Vo equals its nominal value when:

$$K_{CAL} = f' \quad (8)$$

and the output voltage is not a function of Vin, achieving line voltage rejection. In normal operation, where f' is equal to one, Kcal is equal to one and therefore may be ignored.

Estimation Using the Auto-Zero Gain:

Parametric estimation involves modelling the system in question with an appropriate model and then determining the appropriate parameters for the model. Considering the determination of power loss in a DC-DC converter, an appropriate model is shown in FIG. 5, whereby resistive loss in the power train is considered to be the dominant factor.

Figure 5:
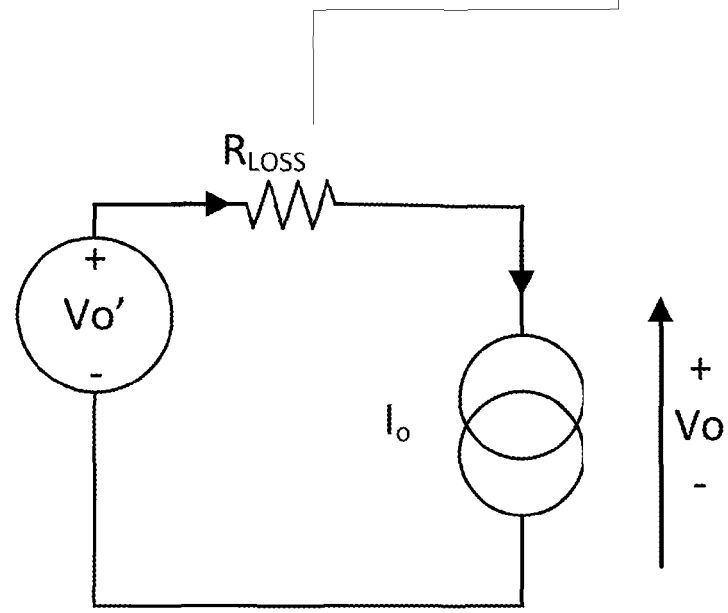
FIG. 5 is an illustration of a loss model for a converter.

From the model of FIG. 5:

$$V_o = V_o' - R_{LOSS} I_o \quad (9)$$

alternatively:

$$V_o = V_o' \cdot K_{LOSS} \quad (10)$$

And from which therefore:

$$1 - K_{LOSS} = \frac{R_{LOSS} \cdot I_o}{V_o'} \quad (11)$$

We also have:

$$V_o' = \frac{\overline{V}_o}{\overline{V}_{in}} K_z \cdot V_{in} \quad (12)$$

therefore:

$$1 - K_{LOSS} = \frac{R_{LOSS} \cdot I_o \cdot \overline{V}_{in}}{\overline{V}_o \cdot K_z \cdot V_{in}} \quad (13)$$

From the description of the auto-zero scheme it will be appreciated that:

$$K_z = \frac{\overline{V}_{in}}{K_{LOSS} \cdot V_{in} \cdot f'} \quad (14)$$

which shows the relationship between the auto-zero gain $K_z$, and the DC-DC converter's modelled loss factor $K_{LOSS}$.

It may also be shown that:

$$\frac{1 - K_{LOSS}}{K_{LOSS}} = \frac{R_{LOSS} \cdot I_o}{V_o} = \frac{V_{in} \cdot K_z \cdot f'}{\overline{V}_{in}} - 1 \quad (15)$$

therefore:

$$\frac{V_o \cdot V_{in} \cdot K_z \cdot f'}{\overline{V}_{in}} - V_o = R_{LOSS} \cdot I_O \quad (16)$$

which illustrates the relationship between the auto-zero gain $K_z$, and the DC-DC converter's modelled loss resistance $R_{LOSS}$, and inductor current (or steady state output current) $I_o$.

Multiplying both sides of the previous equation by $I_o$ it may be shown that the relationship between the auto-zero gain $K_z$, and the dc-dc converter's power loss (in Watts) $P_{LOSS}$ is:

$$\frac{I_o \cdot V_o \cdot V_{in} \cdot K_z \cdot f'}{\overline{V}_{in}} - I_o \cdot V_o = R_{LOSS} \cdot I_o^2 = P_{LOSS} \quad (17)$$

(neglecting zero current losses which are small) this may be simplified to:

$$P_{LOSS} = V_o \cdot I_o \left( \frac{V_{in} \cdot K_z \cdot f'}{\overline{V}_{in}} - 1 \right) \text{ or} \quad (18)$$

$$P_{LOSS} = P_{OUT} \left( \frac{V_{in}}{\overline{V}_{in}} \frac{\overline{V}_{out}}{V_{out}} K_z - 1 \right) \quad (19)$$

Because $P_{LOSS} = P_{IN} - P_{OUT}$ the relationship between the auto-zero gain $K_z$, and the dc-dc converter's input power $P_{in}$ may be shown as:

$$P_{IN} = P_{OUT} \left( \frac{V_{in}}{\overline{V}_{in}} \frac{\overline{V}_{out}}{V_{out}} K_z \right) \quad (20)$$

From this equation, efficiency may be obtained as the ratio of output power to input power, i.e.

$$\text{Efficiency} = P_{OUT} / P_{IN} = \left( \frac{\overline{V}_{in}}{V_{in}} \frac{V_{out}}{\overline{V}_{out} K_z} \right) \quad (21)$$

It will be appreciated by those skilled in the art that $V_{in}$ and $V_{out}$ are conventionally measured for control and regulation purposes. Accordingly, the values for $V_{in}$ and $V_{out}$ are typically readily available. It will be appreciated therefore that in this way, the auto-zero gain $K_z$ may be used to estimate various DC parameters of the dc-dc converter including for example efficiency and power loss.

Although, the above equations have been developed with respect to the auto-zero gain $K_z$, the techniques may also be applied in other types of controllers, for example, a PI or PID controller. In particular, the value of $K_{loss}$ may be derived from a value within such a PI or PID controller. For example for a buck converter operating in continuous mode, the value of $K_{loss}$ may be stated as $$K_{loss} = \left(\frac{V_{out}}{V_{in}}\right)\left(\frac{1}{\bar{d}}\right) \quad (22)$$

where
$\bar{d}$ is the average duty cycle value.

It will be appreciated that under steady state conditions, the steady state error in a PID controller controlling the operation of such a buck converter would ideally be zero and so the only element of the PID controller affecting the duty cycle would be the integrator (I) term and thus the average duty cycle value (i.e. output from the PID controller) may be taken as the output from the integrator part of the PID controller. The use of the integrator term effectively eliminates noise and transients that may be present in a direct measurement of the duty cycle value.

As $K_{loss}$ is related to $K_z$ from equation (4) above $$K_z = \frac{V_{in}}{K_{LOSS} \cdot V_{in} \cdot f'}$$

it will be appreciated that the value of the integrator output from a PI or PID controller may be employed to provide a value of $K_z$ from which the following techniques may be applied in the same manner as the directly obtainable $K_z$ value described above.

Optimum Phase Add/Drop Point

In a multiphase power converter it is known that phases may be added and dropped in response to the load current. As would be familiar to those skilled in the art, there is an optimum load current point at which to add or drop a phase in order to maximize efficiency. This optimum point varies with several circuit parameters, including for example, temperature, input voltage and component values. It is desirable to automatically determine the optimum load current. This may be achieved by modeling the optimum load current at which to add/drop a phase $I_{drop}$ as a function of the losses in the circuit and ultimately, as a function of the auto-zero gain factor $K_z$.

Figure 6:
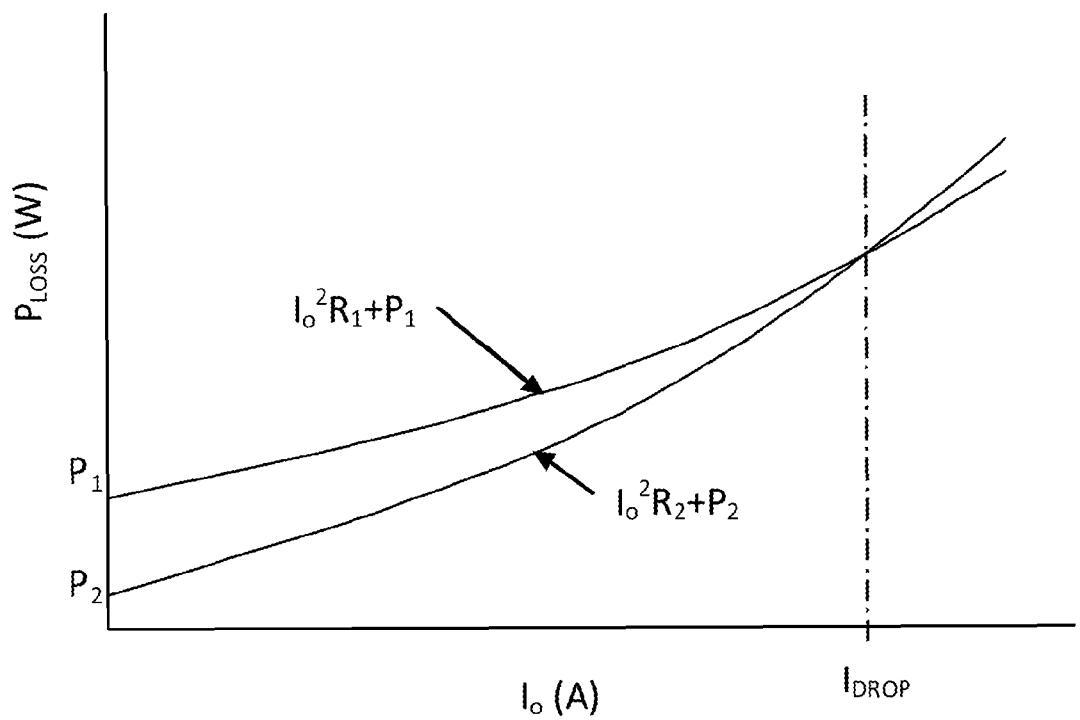
FIG. 6 is an illustration of how the optimum drop point between phases can be determined in a dual phase converter.

A model of the Power loss versus load current of a 2 phase converter is shown in FIG. 6.

It is clear from FIG. 6 that:

$$I_{DROP}^2 = \frac{P_2 - P_1}{R_1 - R_2}$$

which allows the phase drop current to be determined from knowledge of the DC power loss of the converter in two and one phase mode ($P_2$ and $P_1$ respectively), and $R_{LOSS}$ in two and one phase mode ($R_2$ and $R_1$ respectively). These may be known by measurement or may be estimated using techniques such as parametric estimation.

For example, from our model we can write in general:
$P_{LOSS} = I_o^2 R_{LOSS} + P_0$, where $P_0$ represents the DC power loss of the converter.
therefore:

$$R_{LOSS} = \frac{P_{LOSS} - P_0}{I_o^2}$$

and an estimate of $R_{LOSS}$ may therefore be determined from our previous estimate of $P_{LOSS}$.

Let P(0) represent the difference between the zero current power loss of the converter in 2 phase and 1 phase mode:

$$P(0) = P_2 - P_1$$

we have:

$$I_{DROP}^2 = \frac{P(0)}{R_1 - R_2}$$

With $R_1$ and $R_2$ representing $R_{LOSS}$ in 1 and 2 phase mode respectively, substituting in the estimate of $R_{LOSS}$:

$$I_{DROP}^2 = \frac{P(0)}{\frac{V_o}{V_{in}}\left(\frac{\left(V_{in} \cdot K_{z1} - \frac{V_{in}}{f'}\right)}{I_1} - \frac{\left(V_{in} \cdot K_{z2} - \frac{V_{in}}{f'}\right)}{I_2}\right)}$$

where $R_1$ is estimated to be (with $R_2$ estimated similarly):

$$\hat{R}_1 = \frac{V_o}{V_{in}} \frac{\left(V_{in} \cdot K_{z1} - \frac{V_{in}}{f'}\right)}{I_1}$$

The calculation of $I_{DROP}$ may be considerably simplified if the current in one phase operation ($I_1$) is equal to the current in two phase operation ($I_2$) at which the auto-zero gains $K_{z1}$ and $K_{z2}$ are determined:

$$I_{DROP}^2 = \frac{P(0)}{\frac{V_o}{V_{in}} V_{in}(K_{z1} - K_{z2})}$$

Therefore the current at which to drop or add a phase ($I_{DROP}$) may be determined by calculations involving the auto-zero gains determined during one and two phase operation respectively ($K_{z1}$ and $K_{z2}$) at a known arbitrary current. It will be appreciated that switchover between modes may be effected at the optimum point. Moreover, the optimum point may be recalculated on an-going basis to account for variations.

Figure 7A:
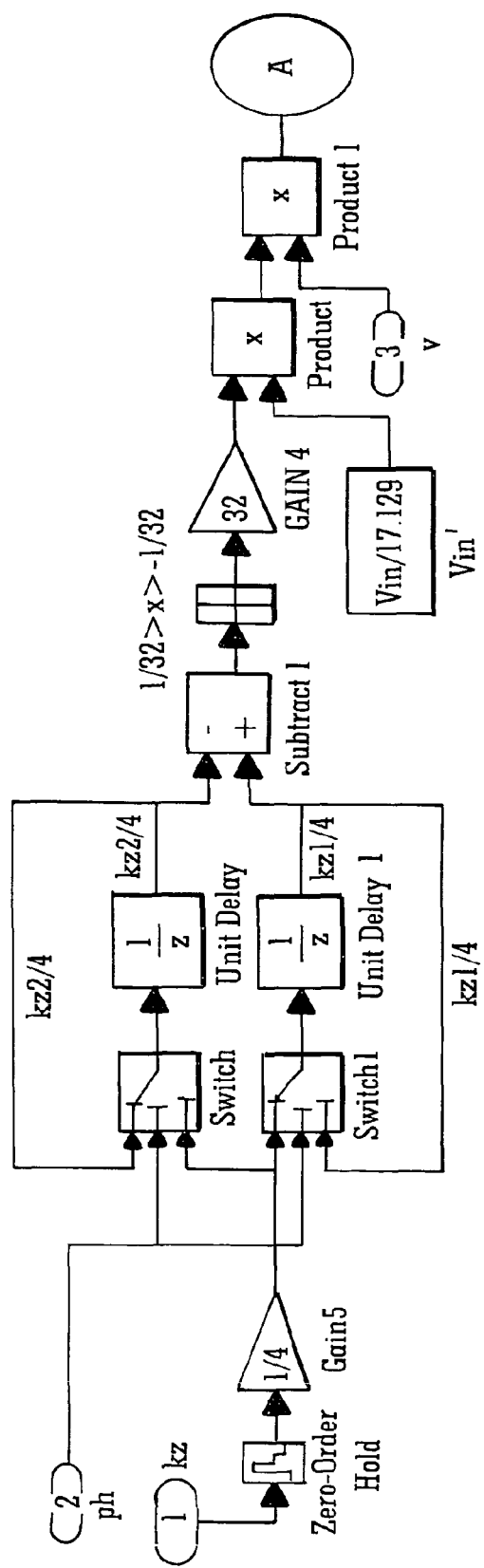
FIGS. 7a, 7b and 7c represent a state diagram for a circuit implementing the calculation of the optimum drop point between phases corresponding to the graphical representation of FIG. 6.
Figure 7B:
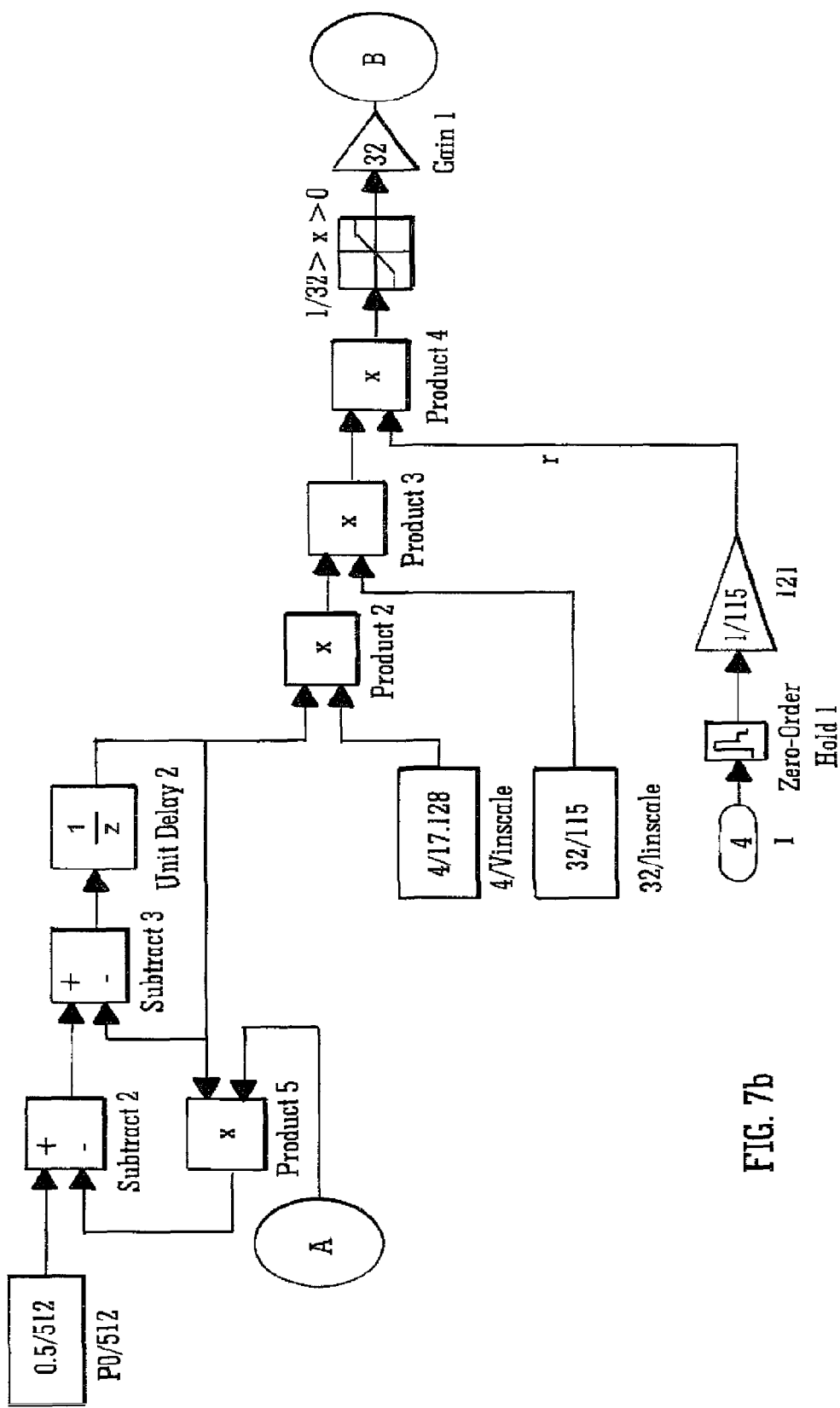
Figure 7C:
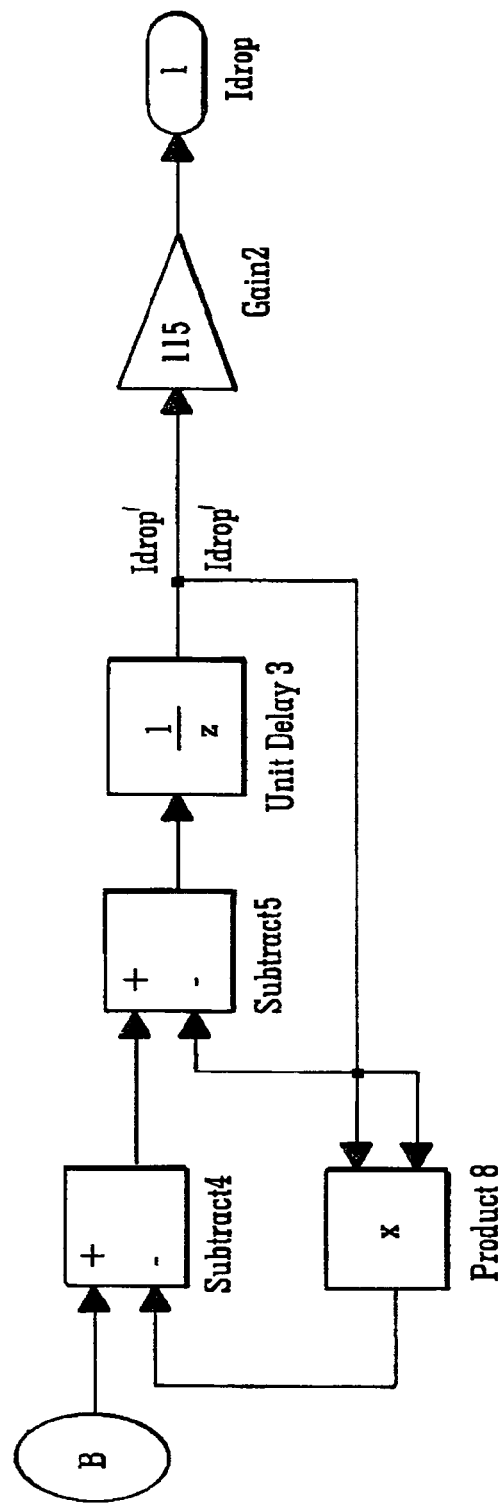

As an example of an implementation, a state diagram\circuit for computing $I_{DROP}$ in an ASIC or DSP by this method is illustrated in FIGS. 7a-c.

It will be appreciated that once $I_{DROP}$ is determined, a controller may switch between one and two phase operation at this current to ensure maximum efficiency. Moreover, whilst it will be appreciate that the above explanation and implementation has been made with reference to two phases it will be appreciated that it may be extended to more than two phases with a plurality of switchover points.

The measured efficiency value may also be employed to adjust an operating parameter of the controller. For example, it will be appreciated by those skilled in the art that efficiency may vary with the switching frequency of a DC-DC circuit. Accordingly, the measured efficiency value may be employed to adjust the switching frequency of the controller, with the switching frequency being, for example, adjusted upwards or downwards dependent on whether a previous change in switching frequency (upwards\downwards) resulted in a higher or lower efficiency. In this way, an optimum frequency of operation to maximize efficiency may be determined.

Similarly, the degree of overlap between switching devices in a switching circuit would be known to have an influence on the efficiency of the switching circuit. In a digital controller, this degree of overlap may be a pre-programmed or preset value. This preset\preprogrammed value may not be the preferred value as the components (e.g. switching transistors) selected for the converter may not be known at the time of determining the preset value. Moreover, manufacturer tolerances and drift may also have an effect on the preferred degree of overlap. It will be appreciated that by allowing the controller to adjust the preset\preprogrammed value an improvement in efficiency may be obtained. For example, the controller may adjust this pre-programmed value upwards\downwards and by comparing the efficiency of the converter before and after such changes, the controller may tune the pre-programmed value to an optimum overlap value to maximize efficiency. It will be appreciated that such a tuning process may be performed initially on start-up, during a calibration stage or periodically.

In a further arrangement, the controller may be configured to provide a measure of the efficiency and\or losses to an external device. The external device in turn may use the efficiency and\or measurement value for monitoring and\or control purposes. For example, in a computer server, an individual controller may be configured to provide a measure of its losses and\or efficiency to the central power management function of the server over a local communications bus.

A measure of efficiency\losses may be employed in a variety of ways. For example, the server may analyze overall efficiency\losses and adjust the input voltage provided to the switching circuits to improve the overall efficiency.

Figure 8:
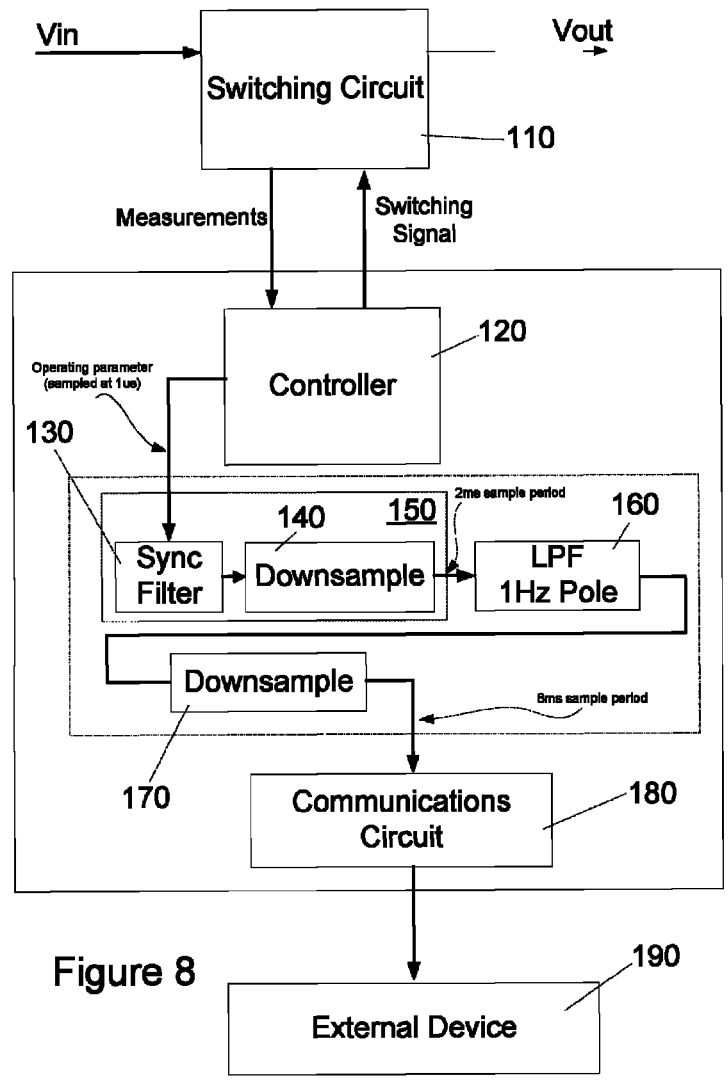
FIG. 8 is an illustration of a further embodiment, FIG. 9 are the results of a computer simulation illustrating the performance of the embodiment of FIG. 8.

A difficulty with providing a measure of a parameter such as efficiency from the controller to an external device is that providing an instantaneous measure of efficiency in itself may be meaningless as a result of the presence of noise. Similarly, the dynamic nature of a particular measure may mean that an instantaneous measurement of efficiency or indeed another parameter (e.g. losses) is in itself of limited benefit. To address this the present application provides for a time averaged value rather than an instantaneous value. Specifically, the exemplary further arrangement, as shown in FIG. 8, provides a value representative of an averaged value over time. This averaged value represents a value which may for example correspond to the average over a period of one tenth of a second, whereas a measurement of the actual value may be produced\available in a much shorter period, for example every 1 μs. It will be appreciated that producing a slow average value from such a fast value in such a configuration would normally result in a complex filter circuit which would be extremely difficult and costly to implement in analog form and relatively costly in terms of computational requirements to produce in a digital low pass filter.

The filter module arrangement employed in FIG. 8 overcomes these difficulties. Referring to FIG. 8, the arrangement includes a switching circuit 100 and a controller 120. In particular, the arrangement accepts a parameter from the controller 120. This parameter may be one that is generated internally within the controller 120, for example efficiency or power loss or it may be a measure which is employed internally within the controller 120 (for example a measure of the output current or output voltage from the controller 120 which are typically measured and provided to the controller 120 by means of one or more digital to analog converters. However, for reasons of simplicity of explanation, the circuit will now be described with reference to the use of the efficiency value generated within the controller 120. This efficiency value is available at a sampling rate equivalent to the operating rate of the controller 120. This efficiency value is first filtered by a sync filter 130 in combination with a first downsampler 140 in an arrangement known generally as a Hogenauer decimater 150. The sync filter 130 is designed so that its initial notch corresponds to the downsampled frequency. In the exemplary arrangement the downsampling factor is 2048. It will be appreciated that 2048 is a convenient value to implement digitally since it represents $2^{11}$, which is easily implemented digitally. Depending on requirements other values for the downsampling factor may be chosen. Moreover, it will be appreciated that the downsampling factor may be a programmable value which may be set by a user of a system depending on their desired configuration.

Figure 9:
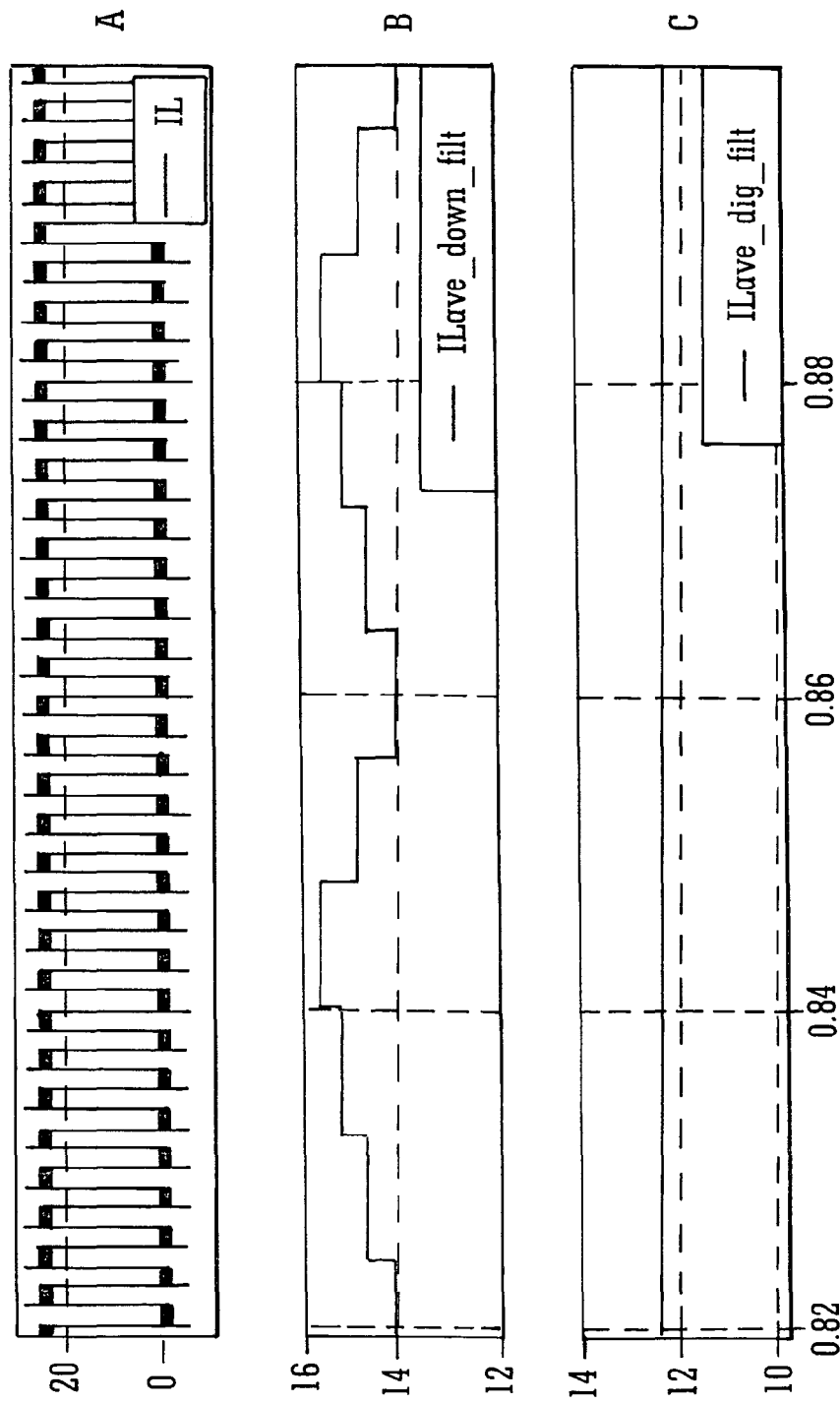

The output from the first downsampling filter 140 is then applied as an input to a low pass filter 160, which is selected to suitably have a pole around 1 Hz. It will be appreciated that this low pass filter 160 is relatively simple to implement in contrast to the LPF that would be required in the absence of sync filter downsampler arrangement. The output from the low pass filter 160 is then down sampled in a second downsampler 170 by a further factor of 4. The output is then transferred via a communications circuit 180 to an external device 190. The use of two decimators makes the data rate easier to handle. The actual arrangement may be implemented in firmware. The implementation in firmware allows for adjustments to be made to the circuit as required. The performance of the circuit is illustrated in the simulation results of FIG. 9, which illustrate current values after an initial stabilization period of 0.8 sec after switching on a converter and in which a first trace (A) illustrates the actual inductor current as might be measured by a sensor. The second trace (B) illustrates the output using a conventional approach of down sampling with a low pass filter. It will be appreciated that whilst the down sampling filter approach is of more use than the actual measured values, the information would be of little use as an average value for performance measurement since it varies considerably with time (i.e. significant ripple). In contrast, the results of the above described approach produce the third trace (C) which has minimal ripple.

As described above, one advantage of having the individual controllers feedback their individual losses and\or efficiency measurements to a main controller is that the main controller may adjust a parameter on which the individual controllers are reliant. For example, the main controller may adjust the BUS voltage, i.e. the voltage powering the individual power converters around the circuit to optimize the overall performance.

Another advantage of having the individual controllers feedback their individual losses and\or efficiency measurements to a main controller is that this information may be stored and\or presented to a user, for example using a software interface with a suitable graphical user interface. This allows a circuit designer to examine the operation of their circuit without having to insert measurement sensors into the circuit which is disruptive. The technique also allows circuit designers\manufacturers to examine different settings on the circuit. For example, the circuit designer can examine the effects of running different processors at different speeds and ensure that doing so does not unnecessarily increase losses. Similarly, the effect of replacing a component (e.g. a processor) within a circuit can more accurately be examined. In a design stage, the measurements from the individual converters on a proto-type or pre-production circuit may be employed to assist in the circuit layout to even out the heat production on the circuit. Similarly, the information may be employed to ensure that heat dissipation techniques e.g. heat sinks and fans are optimally placed or that the individual converters are operating at parameters that ensure the performance of such heat dissipation elements is maximized.

Figure 10:
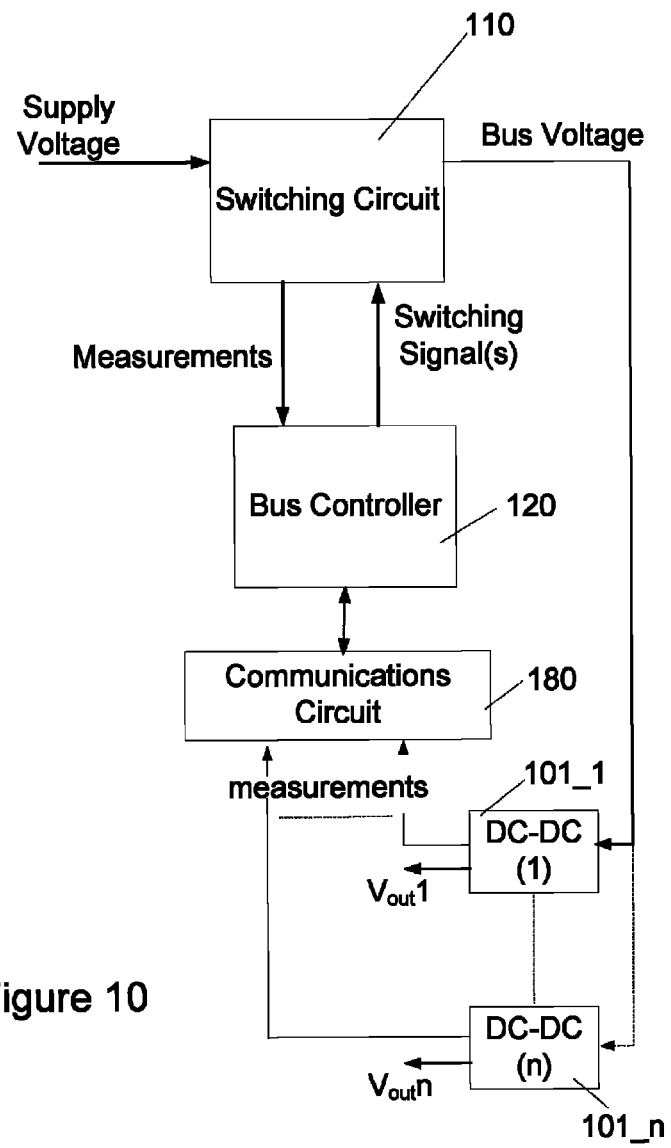
FIG. 10 illustrates an arrangement of a distributed power supply in which there are a plurality of DC-DC converters distributed about a system, according to an another embodiment.

FIG. 10 illustrates an arrangement of a distributed power supply in which there are a plurality of DC-DC converters 101_1 to 101_n distributed about a system (e.g. a computer server, or even a circuit board within such a server) including a communications circuit 180 and a bus controller 120. Such an arrangement would be generally familiar to those skilled in the art. In particular, there is a primary power supply which supplies a bus voltage via a primary power converter 100 to each of a group of DC-DC converters 101_1 to 101_n. In the exemplary arrangement shown, there is only one primary power supply supplying one bus voltage, however in practice it will be appreciated that more complicated arrangements may be provided. For example, there may be several primary power supplies each providing a different bus voltage to a different group of secondary converters. Moreover, the primary power converter 100 may be a AC-DC converter driven by the mains or it may be a DC-DC converter driven by a battery or a AC-DC converter. However, for the context of explaining the operation of the present application, the simple case of a number of secondary DC-DC converters being supplied with their input voltage from a common bus voltage provided by a primary power supply will be employed. It will be appreciated that in the present context, the terms primary and secondary refers to the relationship between the primary power converter 100 providing the bus voltage to the secondary DC-DC converters 101_1 to 101_n, i.e. it is the primary source of power for these converters rather than the ultimate source of the power.

Whilst the arrangement would generally be familiar to those skilled in the art, each DC-DC converter 101_1 to 101_n provides a value of their individual power loss back to the bus controller 120 of the primary power converter 100 via the communications circuit 180, for example using the techniques described above. It will be appreciated that other methods may also be employed for measuring power loss including for example direct measurement of currents.

The bus controller 120 of the primary power converter 100 in turn receives each of these measurements and may sum them to provide an overall loss measurement for the secondary DC-DC converters 101_1 to 101_n. This value may be summed with the power loss of the primary power converter 100 as measured by the primary bus controller 120, using for example the techniques described above, to provide a power loss figure for the overall power system comprising the primary and secondary converters.

Typically, the loads driven by the outputs of the secondary DC-DC converters require tight controlled voltages. However, the secondary DC-DC converters can accommodate an input voltage over a relatively wide range. The optimum input voltage for maximum efficiency will depend on a variety of factors including the load and temperature. Accordingly, the optimum input voltage for one DC-DC converter in a circuit is unlikely to be the optimum voltage for another. By feeding back, the measure of individual power loss from each converter to the controller of the primary DC-DC converter, this controller may adjust the bus voltage being provided to each DC-DC converter to minimize the power loss throughout the circuit.

It will be appreciated that whilst the present application has been described generally with respect to measurement of power loss, that the measurements may be also be represented as a voltage or current loss. Thus for example in the case of voltage, the power loss may be represented as a measure of the voltage drop on the output. Similarly, the power loss may be represented as an equivalent current loss equating to a measure of the current effectively diverted from the load equating to the power loss. Similarly, whilst the present application has been described primarily with respect to the use of a measure from an auto-zero circuit to estimate losses, it will be understood that equally a value from an integrator may be employed where the control loop is, for example, a PI or PID type controller. Accordingly, the present application is not limited to the use of an auto-zero loop but also includes the use of a measure from an integrator in a control loop to measure losses.

The words comprises/comprising when used in this specification are to specify the presence of stated features, integers, steps or components but does not preclude the presence or addition of one or more other features, integers, steps, components or groups thereof.

The invention claimed is:

1. A controller for controlling a switching DC-DC converter having at least one switching circuit for converting an input voltage to an output voltage, the controller comprising:
   a control loop which is configured to attempt to maintain the output voltage at a predetermined level, and
   a loss estimator providing a calculated estimate of absolute loss in the switching circuit, the absolute loss representing a difference between input power to the switching circuit and output power from the switching circuit, using an internal parameter of the control loop.

2. A controller according to claim 1, wherein the control loop comprises a feedback loop which is configured to attempt to maintain the output voltage at a predetermined level and an auto-zero loop for reducing errors in the feedback loop by adjusting a feedback gain, wherein the feedback gain is the parameter employed by the loss estimator.

3. A controller according to claim 2, wherein the loss estimator estimates power loss using the equation $$P_{LOSS} = P_{OUT}\left(\frac{V_{in}}{\overline{V}_{in}}\frac{\overline{V}_{out}}{V_{out}}K_z - 1\right)$$

where $P_{out}$ is the output power, $V_{in}$ and $V_{out}$ the measured input and output voltages, with $\overline{V}$ being their nominal values, and $K_z$ is the feedback gain of the auto-zero loop.

4. A controller according to claim 1, wherein the control loop comprises a integrating controller, wherein the output of the integrating controller is the internal parameter employed by the loss estimator.

5. A controller according to claim 4, wherein the loss estimator estimates power loss using the equation $$P_{LOSS} = P_{OUT}\left(\frac{V_{in}}{\overline{V}_{in}}\frac{\overline{V}_{out}}{V_{out}}K_z - 1\right)$$

where $P_{out}$ is the output power, $V_{in}$ and $V_{out}$ the measured input and output voltages, with $\overline{V}$ being their $\overline{V}$ nominal values, and $K_z$ equals $$\frac{V_{in}}{K_{LOSS} \cdot V_{in} \cdot f'}$$

where f' is an error and $K_{loss}$ equals $$\left(\frac{V_{out}}{V_{in}}\right)\left(\frac{1}{\bar{d}}\right)$$

where $\bar{d}$ is the output from the integrating controller.

6. A controller according to claim 1, wherein the estimate of loss is a Power Loss.

7. A controller according to claim 1, wherein the estimate of loss is a Current Loss.

8. A controller according to claim 1, wherein the estimate of loss is a Voltage Loss.

9. A controller according to claim 1, wherein the estimate of loss is a Power Conversion Factor and wherein the controller is adapted to calculate the input power from the output power using this Power Conversion Factor.

10. A controller according to claim 1, wherein the DC-DC converter has at least two modes of operation and wherein the estimate of loss is employed to select the most efficient mode of operation for current operating conditions.

11. A controller according to claim 1, wherein the estimate of loss is used to tune at least one operating characteristic of the DC-DC converter.

12. A controller according to claim 11, wherein the at least one operating characteristic comprises a switching frequency.

13. A controller according to claim 11, wherein the at least one operating characteristic comprises the degree of overlap between complementary switches in the switching circuit.

14. A controller according to claim 1, further comprising a communications circuit for providing the estimate of loss as a signal to a circuit external to the controller.

15. A DC-DC converter comprising a controller according to claim 1.

16. A Power control arrangement comprising at least one controller according to claim 14, wherein the power control arrangement further comprises a bus voltage controller for controlling the voltage on a supply bus for providing an input voltage to the DC-DC converter, the bus voltage controller being responsive to the estimate of loss signal provided by the controller.

17. A controller for a power supply for supplying a DC bus voltage to a plurality of DC-DC switching converters, wherein the controller is configured to control at least one switching circuit providing the DC bus voltage from an input voltage, wherein the controller is configured to receive a measure of efficiency, representing the ratio between power output and power input, and/or power loss, representing the difference between power input and power output, value from each of the plurality of DC-DC switching converters and wherein the controller is further configured to adjust the bus voltage in response to the received power loss values to minimize overall power loss for the plurality of DC-DC switching converters.

18. A power supply comprising:
a) a controller according to claim 17,
b) at least one switching circuit for providing the DC bus voltage from the input voltage and controlled by the controller.

19. A switching DC-DC converter comprising:
at least one switching circuit for converting an input voltage to an output voltage,
a controller having a control loop for controlling the operation of the switching circuit, the controller having an auto-zero loop for modifying a feedback gain to reduce error in the control loop, and
a loss estimator adapted to estimate a power loss corresponding to a difference between input power to and output power from the at least one switching circuit from the value of feedback gain.

20. A switching DC-DC converter comprising:
at least one switching circuit for converting an input voltage to an output voltage, the at least one switching circuit having at least two switching phases, wherein the at least one switching circuit is configured to operate in a first mode or a second mode where the modes are differentiated by the combination of switching phases employed,
a controller, the controller having a control loop for controlling the at least one switching circuit and an auto-zero loop estimator for minimizing the loop error in the control loop by adjusting a feedback gain value in the control loop,
an estimator for estimating a first loss value representing a difference between input power to and out output power from the switching circuit when operating in a first mode and a second loss value representing a difference between input power to and output power from the switching circuit when operating in a second mode,
a mode selector for switching the controller between the first and second modes at a crossover point wherein the mode selector is responsive to the first and second loss values in determining the crossover point.

21. A digital controller for a switch mode power supply, the digital controller providing at least one switching signal to a switching circuit, the digital controller having one or more signals internally corresponding to one or more operating parameters, the one or more signals being available at a first rate from the controller characterized in that the digital controller comprises:
a first filter for filtering the at least one parameter to provide a filtered at least one parameter signal,
a first downsampler for downsampling the filtered at least one parameter signal from the first rate to a second rate to produce a downsampled at least one parameter signal,
a communications circuit for communicating the downsampled at least one operating parameter to a device external to the controller.

22. A digital controller according to claim 21, further comprising a second filter for low pass filtering the downsampled at least one parameter signal to provide an average measure of the at least one operating parameter, and a communications circuit for communicating the at least one operating parameter to a device external to the controller.

23. A digital controller according to claim 22, wherein the communications circuit is a register which may be polled by an external device.

24. A digital controller according to claim 21, further comprising a second downsampler for downsampling the average measure of the at least one operating parameter before providing it to the device external to the controller.

25. A DC bus voltage controller being adapted to operate at least one switching circuit to provide a common DC bus voltage to a plurality of switching DC-DC converters, which in turn deliver power locally in one or more circuits, wherein the bus voltage controller is configured to receive a measure of power loss representing a difference between input power to and output power from each of the plurality of DC-DC switching converters, wherein the DC bus controller is adapted to adjust the bus voltage in response to the received power loss measurements.

26. A DC bus voltage controller according to claim 25, wherein the bus voltage controller adjusts the bus voltage to minimize the overall power loss.

\* \* \* \* \*